(12) United States Patent
Yi

(10) Patent No.: US 12,535,394 B2
(45) Date of Patent: Jan. 27, 2026

(54) TAB TENSION MEASURING DEVICE OF CELL AND TAB TENSION MEASURING METHOD OF CELL

(71) Applicant: LG Energy Solution, Ltd., Seoul (KR)

(72) Inventor: Kyu Min Yi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 340 days.

(21) Appl. No.: 18/280,024

(22) PCT Filed: Dec. 27, 2022

(86) PCT No.: PCT/KR2022/021344
§ 371 (c)(1),
(2) Date: Sep. 1, 2023

(87) PCT Pub. No.: WO2023/128538
PCT Pub. Date: Jul. 6, 2023

(65) Prior Publication Data
US 2024/0151616 A1 May 9, 2024

(30) Foreign Application Priority Data
Jan. 3, 2022 (KR) .................. 10-2022-0000163

(51) Int. Cl.
*G01N 3/08* (2006.01)
*G01N 3/20* (2006.01)
(Continued)

(52) U.S. Cl.
CPC ............. *G01N 3/08* (2013.01); *G01L 5/045* (2013.01); *G01L 5/047* (2013.01); *G01N 3/20* (2013.01); *H01M 10/04* (2013.01); *H01M 10/4285* (2013.01); *H01M 10/48* (2013.01); *H01M 50/531* (2021.01); *Y02E 60/10* (2013.01)

(58) Field of Classification Search
CPC . G01N 3/08; G01N 3/20; G01L 5/045; G01L 5/047; H01M 10/04; H01M 10/4285; H01M 10/48; H01M 50/531; Y02E 60/10
See application file for complete search history.

(56) References Cited

U.S. PATENT DOCUMENTS 10,996,150 B2 * 5/2021 Jeong ................ G01N 3/02
11,161,252 B2 11/2021 Lin et al.
(Continued)

FOREIGN PATENT DOCUMENTS

| CN | 109425389 A | 3/2019 |
| JP | 2001160389 A | 6/2001 |

(Continued)

OTHER PUBLICATIONS

International Search Report for PCT/KR2022/021344 mailed Mar. 30, 2023. 3 pages.
(Continued)

*Primary Examiner* — Jonathan M Dunlap
(74) *Attorney, Agent, or Firm* — Lerner David LLP

(57) ABSTRACT

An embodiment of the present invention provides a tab tension measuring device of a cell including a tab and a lead connected to the tab, including: a pair of jigs fixing the tab; a pair of bending dies bending the lead; and a tension meter connected to the cell to measure the tension applied to the tab when the lead is bent.

11 Claims, 2 Drawing Sheets

(51) Int. Cl.
  *G01L 5/04* (2006.01)
  *H01M 10/04* (2006.01)
  *H01M 10/42* (2006.01)
  *H01M 10/48* (2006.01)
  *H01M 50/531* (2021.01)

(56) References Cited

U.S. PATENT DOCUMENTS

| | | |
|---|---|---|
| 2015/0090048 A1 | 4/2015 | Kim et al. |
| 2015/0243962 A1 | 8/2015 | Hiroki et al. |
| 2016/0184911 A1 | 6/2016 | Masuda et al. |
| 2019/0064277 A1 | 2/2019 | Cai et al. |
| 2019/0148705 A1 | 5/2019 | Park et al. |
| 2019/0265135 A1 | 8/2019 | Jeong et al. |
| 2020/0225134 A1* | 7/2020 | Jeong ............... G01N 3/20 |
| 2020/0328396 A1 | 10/2020 | Cho et al. |

FOREIGN PATENT DOCUMENTS

| | | | |
|---|---|---|---|
| JP | 2012099317 A | 5/2012 | |
| KR | 20120029584 A | 3/2012 | |
| KR | 20150037076 A | 4/2015 | |
| KR | 101531177 B1 | 6/2015 | |
| KR | 20160079697 A | 7/2016 | |
| KR | 20160124144 A | 10/2016 | |
| KR | 101731146 B1 | 4/2017 | |
| KR | 101761971 B1 | 7/2017 | |
| KR | 101807868 B1 | 12/2017 | |
| KR | 20190002317 A | 1/2019 | |
| KR | 20190054617 A | 5/2019 | |
| KR | 20190135856 A | 12/2019 | |
| KR | 20200005290 A | 1/2020 | |
| KR | 20200035594 A | 4/2020 | |
| KR | 20200105272 A | 9/2020 | |
| KR | 20200109040 A | 9/2020 | |
| KR | 20210021871 A | 3/2021 | |
| KR | 102263601 B1 | 6/2021 | |
| KR | 20210147520 A | 12/2021 | |
| WO | 2011/052091 A1 | 5/2011 | |

OTHER PUBLICATIONS

Extended European Search Report including Written Opinion for Application No. 22916679.8 dated Feb. 19, 2025. pp. 1-9.

* cited by examiner

【Figure 1】
(A)
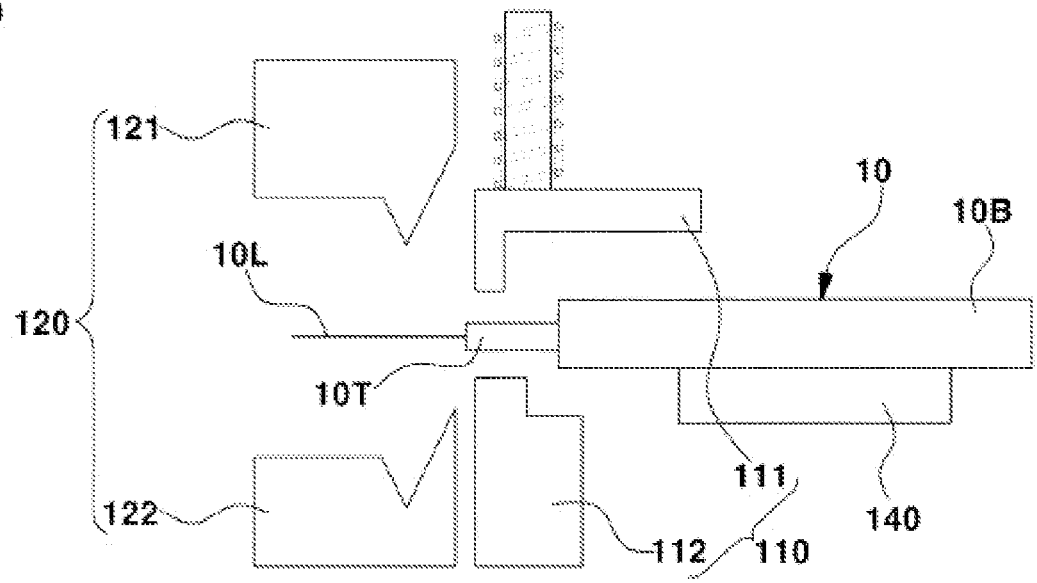
(B)
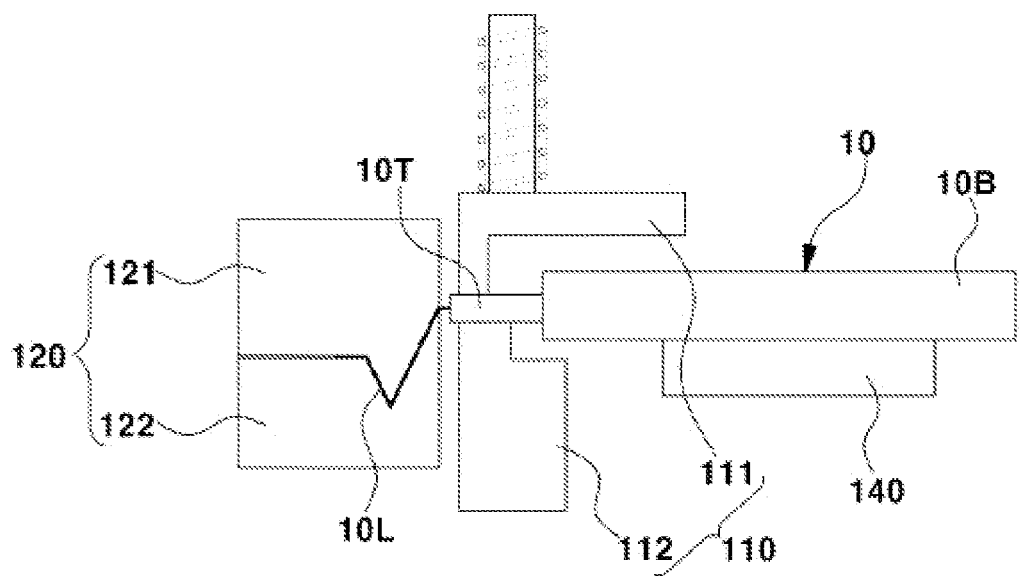

[Figure 2]
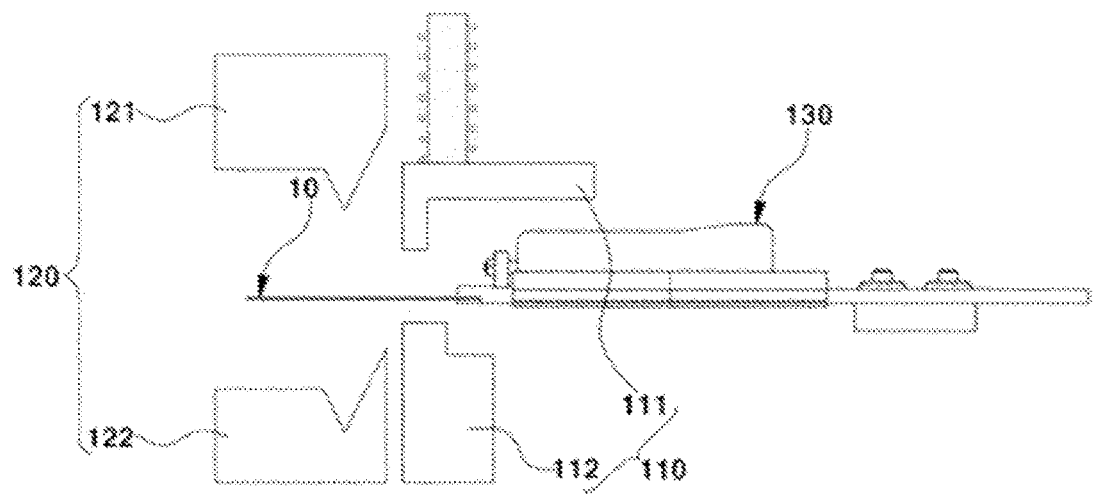
[Figure 3]
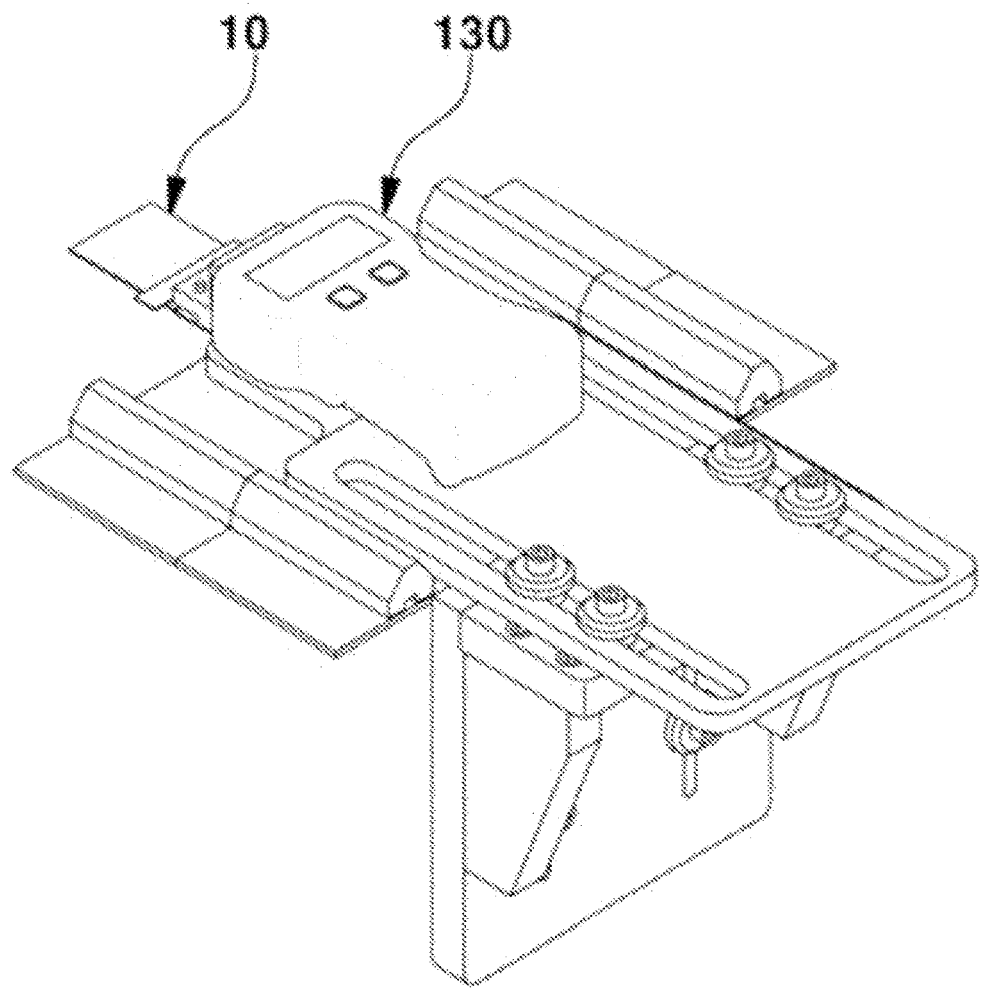

TAB TENSION MEASURING DEVICE OF CELL AND TAB TENSION MEASURING METHOD OF CELL

CROSS-REFERENCE TO RELATED APPLICATIONS

This application is a national phase entry under 35 U.S.C. § 371 of International Application No. PCT/KR2022/021344, filed on Dec. 27, 2022, which claims priority to Korean Patent Application No. 10-2022-0000163, filed on Jan. 3, 2022, the disclosures of which are hereby incorporated by reference herein in their entireties.

TECHNICAL FIELD

The present disclosure relates to a tab tension measuring device of a cell and a tab tension measuring method of a cell.

BACKGROUND ART

As technology development and demand for mobile devices increase, rechargeable secondary batteries have been widely used as energy sources for various mobile devices. In addition, secondary batteries are also attracting attention as an energy source for electric vehicles, hybrid vehicles, etc., which are proposed as a solution to air pollution of existing gasoline vehicles or diesel vehicles.

Secondary batteries are classified into coin type batteries, cylindrical batteries, prismatic batteries, and pouch type batteries according to a shape of a battery case. Among them, in the case of the pouch type battery, in order to arrange a plurality of cells on a bus bar or the like, there is a case where a lead of a cell is bent. In this case, a tension may be applied to a tab connected to the lead while bending the lead of the cell, resulting in disconnection of the tab. Currently, there is no device capable of confirming the possibility of disconnection of the tab.

PRIOR ART DOCUMENT

Patent Document (Patent Document 0001) Korean Patent Laid-open Publication No. 10-2021-0021871 (Mar. 2, 2021)

DISCLOSURE

Technical Problem

One of the objects of the present invention is to provide a tab tension measuring device of a cell and a tab tension measuring method of a cell capable of measuring the tension applied to the tab to prevent the tab from being disconnected.

Technical Solution

An embodiment of the present invention provides a tab tension measuring device of a cell including a tab and a lead connected to the tab, including: a pair of jigs fixing the tab; a pair of bending dies bending the lead; and a tension meter connected to the cell to measure the tension applied to the tab when the lead is bent.

According to another embodiment of the present invention, a tab tension measuring method of a cell including a tab and a lead connected to the tab includes: fixing the tab; bending the lead; and measuring the tension applied to the tab when the lead is bent.

Advantageous Effects

According to the present invention, it is possible to provide a tab tension measuring device of a cell and a tab tension measuring method of a cell capable of measuring the tension applied to the tab to prevent the tab from being disconnected.

DESCRIPTION OF DRAWINGS

FIG. 1 is a diagram that a tab of a cell is fixed by a jig and a lead is bent by a bending die.

FIG. 2 is a diagram illustrating a tab tension measuring device of a cell according to an embodiment of the present invention.

FIG. 3 is a diagram illustrating a state in which a tension meter according to an embodiment of the present invention is connected to a cell.

BEST MODE

Hereinafter, embodiments of the present invention will be described in detail with reference to the accompanying drawings. In the drawings, all or part of the configuration may be exaggerated for convenience of description.

In addition, it will be evident to those skilled in the art that the present invention is not limited to the accompanying drawings or the contents described in this specification, and that the present invention can be implemented in various forms without departing from the technical spirit of the present invention.

FIG. 1 illustrates that a tab of a cell is fixed by a jig and a lead is bent by a bending die.

Referring to FIG. 1, a cell 10 includes a tab 10T and a lead 10L connected to the tab. Although not specifically illustrated, a body 10B of the cell 10 may have a structure in which an electrode assembly including a cathode and an anode is sealed in a pouch together with an electrolytic solution, and the cell 10 may be a pouch type cell. The configuration, structure, form, etc., of the cell 10 including the tab 10T and the lead 10L are not particularly limited, and various types of cells used in the art may be used in the embodiment of the present invention.

Referring to FIG. 1A, first, the tab 10T of the cell 10 is fixed by a pair of jigs 110. The pair of jigs 110 includes an upper jig 111 and a lower jig 112. In this case, the pair of jigs 110 may press and fix the tab 10T on both surfaces of the tab 10T. Specifically, the upper jig 111 descends and the lower jig 112 ascends so that these jigs may contact both surfaces of the tab 10T and may press and fix the tab 10T on both surfaces of the tab 10T.

Referring to FIG. 1B, next, the lead 10L of the cell 10 is bent by a pair of bending dies 120. The pair of bending dies 120 includes an upper bending die 121 and a lower bending die 122. In this case, the pair of bending dies 120 may press and bend the lead 10L on both surfaces of the lead 10L. Specifically, the upper bending die 121 descends and the lower bending die 122 ascends so that these bending dies contact both surfaces of the lead 10L and press the lead 10L on both surfaces of the lead 10L.

The pair of bending dies 120 may have a shape in which the bending dies 120 are engaged with each other. In other words, the upper bending die 121 and the lower bending die 122 may have shapes corresponding to each other. For example, in an area where the upper bending die 121 has a concave portion, the lower bending die 122 may have a convex portion corresponding to the concave portion of the upper bending die 121, and in an area where the upper bending die 121 has a convex portion, the lower bending die 122 may have a concave portion corresponding to the convex portion of the upper bending die 121. Therefore, the pair of bending dies 120 is engaged with each other as the upper bending die 121 descends and the lower bending die 122 ascends, and press and bend the lead 10L disposed therebetween on both surfaces of the lead 10L.

The cell 10 may be conveyed by the conveyor 140. The cell 10 being conveyed by the conveyor 140 may stop for a certain period of time in the area where the lead 10L is bent, the tab 10T may be fixed by the jig 110, and the lead 10L may be bent by the bending die 120. The conveyor 140 may be a conveyor belt, but is not limited thereto. The conveyor 140 may convey the cell 10 in a direction penetrating and/or entering the drawing.

Meanwhile, in order to arrange a plurality of cells on a bus bar or the like, there may be a case where the lead 10L of the cell 10 is bent. In this case, as described above, when the tab 10T is fixed by the jig 110 and the lead 10L is bent by the bending die 120, the tension is applied to the cell 10, in particular, the tab 10T connected to the lead 10L, resulting in the disconnection of the tab 10T. Accordingly, there is a need for a device that may check the possibility of disconnection of the tab 10T.

FIG. 2 illustrates a tab tension measuring device of a cell according to an embodiment of the present invention.

The tab tension measuring device 100 of a cell according to an embodiment of the present invention includes the pair of jigs 110 for fixing the tab 10T illustrated in FIG. 1 and the pair of bending dies 120 for bending the lead 10L, and further includes a tension meter 130 for measuring the tension applied to the tab 10T when the lead 10L is bent. In addition, the tab tension measuring device 100 of a cell according to an embodiment of the present invention may further include a conveyor 140.

Although not specifically illustrated in the drawing, the cell 10 includes the tab 10T and the lead 10L connected to the tab, as illustrated in detail in FIG. 1. The arrangement direction of the cells 10 may also be the same as the direction illustrated in FIG. 1. That is, the cells 10 may be arranged so that the tab 10T is located between the pair of jigs 110, and the lead 10L is located between the pair of bending dies 120. Based on the drawing, the cells 10 may be arranged so that the lead 10L bent by the bending die 120 is located on the left side.

The pair of jigs 110 includes an upper jig 111 and a lower jig 112. In this case, the pair of jigs 110 may press and fix the tab 10T on both surfaces of the tab 10T. Specifically, the upper jig 111 descends and the lower jig 112 ascends so that these jigs may contact both surfaces of the tab 10T and may press and fix the tab 10T on both surfaces of the tab 10T.

The pair of bending dies 120 includes an upper bending die 121 and a lower bending die 122. In this case, the pair of bending dies 120 may press and bend the lead 10L on both surfaces of the lead 10L. Specifically, the upper bending die 121 descends and the lower bending die 122 ascends so that these bending dies contact both surfaces of the lead 10L and press the lead 10L on both surfaces of the lead 10L.

The pair of bending dies 120 may have a shape in which the bending dies 120 are engaged with each other. In other words, the upper bending die 121 and the lower bending die 122 may have shapes corresponding to each other. For example, in an area where the upper bending die 121 has a concave portion, the lower bending die 122 may have a convex portion corresponding to the concave portion of the upper bending die 121, and in an area where the upper bending die 121 has a convex portion, the lower bending die 122 may have a concave portion corresponding to the convex portion of the upper bending die 121. Therefore, the pair of bending dies 120 is engaged with each other as the upper bending die 121 descends and the lower bending die 122 ascends, and press and bend the lead 10L disposed therebetween on both surfaces of the lead 10L.

The cell 10 may be conveyed by the conveyor 140, and thus, the tab tension measuring device 100 of a cell may further include the conveyor 140. The cell 10 being conveyed by the conveyor 140 may stop for a certain period of time in the area where the lead 10L is bent, the tab 10T may be fixed by the jig 110, and the lead 10L may be bent by the bending die 120. The conveyor 140 may be a conveyor belt, but is not limited thereto. The conveyor 140 may convey the cell 10 in a direction penetrating and/or entering the drawing.

The tension meter 130 is connected to the cell 10 and measures the tension applied to the tab 10T when the lead 10L is bent.

The tension meter 130 may be disposed on an opposite side to the side where the lead 10L of the cell 10 bent by the bending die 120 of the cell 10 is disposed and connected to the cell 10. Based on the drawing, the tension meter 130 may be disposed on the right side of the cell 10 and connected to the cell 10. The tension meter 130 may be connected to the cell 10 and fixed to the cell 10, and thus, measure the tension applied to the cell 10 connected to the tension meter 130.

The direction of the tension applied to the tab 10T may be a direction from the tab 10T toward the lead 10L. In other words, the tension meter 130 may measure the tension applied in the direction in which the lead 10L of the tab 10T is connected. Based on the drawing, the tension meter 130 may measure the tension applied in the left direction of the tab 10T.

As the tension meter 130, any equipment capable of measuring the tension of the tab 10T when the lead 10L is bent by the bending die 120, including a commercially available product, can be used without any kind of limitation.

The tension meter 130 may be fixed on the conveyor 140 conveying the cell 10. Accordingly, when the lead 10L is bent by being connected to the cell 10 disposed on the conveyor 140, the tension applied to the tab 10T may be measured.

Meanwhile, when the tab 10T is fixed by the jig 110 and the lead 10L is bent by the bending die 120, the tension is applied to the tab 10T. When the tension applied to the tab 10T exceeds the limit value, the tab 10T may be disconnected.

In the tab tension measuring device 100 of a cell according to the present invention, the tension applied to the tab 10T when the lead 10L is bent is measured by the tension meter 130, thereby preventing the tab 10T from being disconnected. That is, when the tension measured by the tension meter 130 is equal to or greater than the limit value, it may be determined that there is a possibility of disconnection of the tab 10T. The limit value of the tension may be a tension value at which the tab 10T is disconnected, or may be a value calculated by reflecting a safety factor to the tension at which the tab 10T is disconnected. For example, when the tension at which the tab 10T is disconnected is 110N, the limit value of the tension may be 110N or 55N reflecting a safety factor of 50%. However, this is only an example, and the limit value of the tension at which it can be determined that there is a possibility of disconnection of the tab 10T may be changed according to the actual design of the cell 10 or the like.

Meanwhile, the cell 10 may be a dummy cell. The dummy cell may mean a cell separately manufactured for tension measurement, not an actual product. It is difficult to dispose the tension meter 130 to be connected to the cell 10 due to the limitation of the space where the cells 10 are arranged in the bending equipment including the jig 110 and the bending die 120, and thus, it may be difficult for the tab tension measuring device 100 of a cell to measure the tension applied to the tab of the cell which is the actual product. In this case, the dummy cell is manufactured, and the tab tension measuring device 100 of a cell measures the tension applied to the tab of the dummy cell to predict the tension applied to the tab of the cell which is the actual product, thereby preventing the tab from being disconnected. However, when the space in which the cells 10 are arranged in the bending facility is sufficient, it is of course possible to directly measure the tension applied to the tab of the cell which is the actual product.

Factors that may affect the tension applied to the tab 10T when the lead 10L is bent may include a material of the lead 10L, a sealing temperature of a lead film sealing between the lead 10L and the pouch, a pressure with which the jig 110 presses the tab 10T, a pressure with which the bending die 120 presses the lead 10L, a bending shape (or a shape of an area in contact with the lead of the bending die), and the like. Therefore, when the tension applied to the tab of the cell is measured using the dummy cell, it may be preferable to make the material of the lead at least the same as that of the lead of the actual cell 10. For example, as the lead material of the dummy cell, aluminum (Al), copper (Cu), or an alloy thereof may be used. In addition, it may be preferable to set the sealing temperature of the lead film when manufacturing the dummy cell to be the same as the sealing temperature of the lead film when manufacturing the actual cell. The pressing pressure of the jig 110 and the bending die 120 will not be a problem when using the jig 110 and the bending die 120 that press and bend the actual cell 10.

The present inventors manufactured a pouch type dummy cell in the following manner. However, this is only an example, and the manufacturing method, structure, size, configuration, etc., of the dummy cell are not limited to the following examples. A person skilled in the art will be able to manufacture various types of dummy cells suitable for the tab tension measuring device 100 of a cell.

First, aluminum foil was cut into a size of 150 mm×40 mm (long side 150 mm and short side 40 mm) with a cutter to manufacture a lead.

Next, after a polypropylene film was cut with scissors to a size of 105 mm×15 mm (long side 105 mm and short side 15 mm) and the lead film was folded in half so that the lead film has a size of 52.5 mm×15 mm (long side 52.5 mm and short side 15 mm), both end portions (both end portions disposed on the folded side and the opposite side thereto) thereof were sealed by heating one side with a PP sealing machine (Sambotech, SK-310K) for 0.5 seconds at 160° C.

Thereafter, the lead was disposed between the lead films so that the lead passes between the folded both surfaces of the lead film, and both surfaces of a tape were heated with a sealing machine (UnixHair, UCI-2944FS) for 3 to 4 seconds at 180° C. to seal the lead and the lead film. Specifically, the long side of the lead having a length of 150 mm was disposed in the horizontal direction, and the lead film was sealed so that the short side having a length of 15 mm is disposed in the horizontal direction. In this case, the lead film was disposed 30 mm away from the end portion of the lead. In addition, heating was performed after masking the area to be heated with a Teflon tape without directly contacting the sealing machine.

Next, the aluminum foil was cut into a size of 120 mm×90 mm (long side 120 mm and short side 90 mm) with the cutter to manufacture a pouch. Finally, after the pouch is folded in half so that the pouch has a size of 60 mm×90 mm, and the lead is disposed so that the lead film between the pouches folded in half is located between the pouch and the lead, the pouch and the lid are sealed by pressing for 1 to 2 seconds at 220° C. in a direction from one end of the pouch to the other end, thereby manufacturing the dummy cell. Specifically, the long side of the lead having a length of 150 mm was disposed in the horizontal direction, and the pouch was also sealed so that the long side having a length of 90 mm is disposed in the horizontal direction.

FIG. 3 illustrates a state in which the tension meter according to an embodiment of the present invention is connected to the cell.

As illustrated in the drawing, the cell 10 may be connected to the tension meter 130 by having one end portion of the cell 10 engaged with the tension meter 130. If necessary, the cell may be fixed to the tension meter 130 with a separate screw or the like.

In addition, as described above, the tension meter 130 may be disposed on the side opposite to the side where the lead 10L of the cell 10 bent by the bending die 120 is disposed to be connected to the cell 10. The tension meter 130 may be connected to the cell 10 and fixed to the cell 10, and thus, may measure the tension applied to the cell 10 connected to the tension meter 130.

Meanwhile, the tab tension measuring method of a cell according to an embodiment of the present invention includes fixing the tab 10T, bending the lead 10L, and measuring the tension applied to the tab 10T when the lead 10L is bent.

In the fixing of the tab 10T, the tab 10T may be fixed by pressing both surfaces of the tab 10T. In this case, the tab 10T may be fixed by the pair of jigs 110 described above.

The bending of the lead 10L may be performed after the fixing of the tab 10T. In the bending of the lead 10L, the lead 10L may be bent by pressing both surfaces of the lead 10L. In this case, the lead 10L may be bent by the pair of bending dies 120 described above.

The tension measured in the measuring of the tension applied to the tab 10T when the lead 10L is bent may be the tension applied from the tab 10T toward the lead 10L. In other words, the tension measured in the measuring of the tension may be the tension applied in the direction in which the lead 10L of the tab 10T is connected. In this case, the tension applied to the tab 10T may be measured by the tension meter 130 described above.

In addition, the tab tension measuring method of a cell according to an embodiment of the present invention may further include conveying the cell 10. In this case, the cell 10 may be conveyed by the conveyor 140 described above.

In addition, since the contents of the tab tension measuring method of a cell may be applied substantially the same as the contents described above in the description of the tab tension measuring device of a cell according to an embodiment of the present invention, a detailed description thereof will be omitted.

In the above, an embodiment of the present invention has been described as an example, but the embodiment of the present invention is not intended to be limited to the above-described embodiment. Those skilled in the art will be able to appropriately modify and practice an embodiment of the present invention such as omitting, changing, and substituting all or part of components of the present invention or adding other components with reference to this specification and the accompanying drawings without departing from the technical spirit of the present invention.

In this specification, the order of first, second, etc., is for distinguishing components from each other, and does not mean a priority order between components or an absolute order. A first component in some parts of this specification may be referred to as a second component in other parts of this specification.

The terms and expressions used herein should be interpreted broadly, and should not be interpreted in a limiting sense. The expression "including" in this specification does not exclude the presence or addition of one or more other components other than the mentioned components.

In this specification, expressions in the singular form include plural forms unless explicitly excluded from context.

Each embodiment described as an example in this specification can be combined with each other, and unless contradictory, contents described in a specific embodiment can be equally applied to other embodiments even if not described in other embodiments.

DESCRIPTION OF REFERENCE SIGNS

10: Cell
10B: Body
10T: Tab
10L: Lead
100: Tab tension measuring device of cell
110, 111, 112: Jig
120, 121, 122: Bending die
130: Tension meter
140: Conveyor

The invention claimed is:

1. A tab tension measuring device configured to measure a cell including a tab and a lead connected to the tab, the tab tension measuring device comprising:
a pair of jigs configured to fix the tab thereto;
a pair of bending dies configured to bend the lead; and
a tension meter connected to the cell, the tension meter configured to measure a tension applied to the tab when the lead is bent by the pair of bending dies.

2. The tab tension measuring device of claim 1, wherein the tension meter is configured to measure the tension applied in a direction in which the tab extends.

3. The tab tension measuring device of claim 1, wherein the pair of jigs is configured to press the tab on opposite surfaces of the tab.

4. The tab tension measuring device of claim 1, wherein the pair of bending dies is configured to presses bend the lead on opposite surfaces of the lead.

5. The tab tension measuring device of claim 1, wherein the pair of bending dies has complimentary shapes, such that the bending dies are configured to engage in surface contact with each other.

6. The tab tension measuring device of claim 1, wherein the tension meter is disposed on a first side of the cell that is opposite to a second side of the cell, and the lead is disposed and connected to the cell adjacent to the second side.

7. The tab tension measuring device of claim 1, wherein the cell is a dummy cell.

8. A method of measuring tab tension of a cell including a tab and a lead connected to the tab, the method comprising:
fixing the tab to a pair of jigs;
bending the lead; and
measuring a tension applied to the tab during the bending of the lead.

9. The method of claim 8, wherein, during the measuring of the tension applied to the tab, the tension is applied in a direction in which the tab extends.

10. The method of claim 8, wherein the bending of the lead is performed after the fixing of the tab to the pair of jigs.

11. The method of claim 8, wherein, during the fixing of the tab to the pair of jigs, the tab is fixed by pressing opposite surfaces of the tab between the jigs, and during the bending of the lead, the lead is bent by pressing opposite surfaces of the lead.

* * * * *